United States Patent [19]

Parrilla

[11] 3,997,185
[45] Dec. 14, 1976

[54] BICYCLE FRAME

[76] Inventor: Salvatore C. Parrilla, 6198 Stratford Drive, Parma Heights, Ohio 44130

[22] Filed: Oct. 10, 1975

[21] Appl. No.: 621,279

[52] U.S. Cl. ............................ 280/289 G; 280/239
[51] Int. Cl.² ....................................... B62D 61/12
[58] Field of Search ........... 280/289 G, 289 R, 261, 280/1.184, 293, 239

[56] References Cited

UNITED STATES PATENTS

| 853,115 | 5/1907 | Reuss | 280/289 G |
|---|---|---|---|
| 2,558,880 | 7/1951 | Sartain | 280/289 G |
| 3,023,027 | 2/1962 | Franciscus | 280/289 G |
| 3,096,100 | 7/1963 | Clarke et al. | 280/261 |
| 3,284,096 | 11/1966 | Hansen et al. | 280/289 G |
| 3,653,679 | 4/1972 | Howard | 280/289 G |

Primary Examiner—M. H. Wood, Jr.
Assistant Examiner—Jack D. Rubenstein
Attorney, Agent, or Firm—Baldwin, Egan, Walling & Fetzer

[57] ABSTRACT

A standard bicycle frame is modified by rigidly and permanently securing two generally parallel integral tubular members extending from the head tube of the frame past the seat support tube and then past the axis of the rear wheel and beyond the same rearwardly to a point which will touch the ground when the center of gravity of a rider's body, riding on the rear wheel only, moves backward and approaches dead center over the axis of the rear wheel. These two tubular members are attached to the head tube and one to each side of the seat support tube in a rigid and permanent manner, and are detachably secured one at each end of the opposite ends of the rear wheel axial shaft. Another improvement consists of the head tube extending down to a crosswise crown at the lower end of the head tube, and two generally parallel additional integral tubular members forming a fork extending downwardly and forwardly from the crown, one on each side of the front wheel position, said fork tubular members having through openings to receive the ends of the front wheel axial shaft, and these two generally parallel additional integral members extending forwardly substantially horizontally beyond said shaft-receiving opening to a point beyond that occupied by the front end of a front wheel, and there having structure for attaching a bumper.

4 Claims, 4 Drawing Figures

BICYCLE FRAME

Young people when riding a two-wheel bicycle often pull up on the handlebars to raise the front wheel of the bicycle off of the ground while they ride along on the rear wheel only. If the rider allows the center of gravity of his body to pass backward over the dead center of the rear axle, he may then fall over backwards, causing him to fall with great likelihood of serious injury to himself.

It is an object of the present invention to overcome this danger by adding to a standard bicycle frame an integral tubular structure running from the head tube (which embraces the steering column) downwardly and rearwardly through an intermediate portion of the frame to the rear wheel axle and then rearwardly therefrom to a point which will touch the ground when the center of gravity of a rider's body, riding on the rear wheel only, moves backward and approaches dead center over the axis of the rear wheel. These continuous tubular members extending from the front of the bicycle through to the rear end adapted to touch the ground to prevent the rider falling backward are rigidly fixed in the bicycle frame and provide a very strong structure to prevent injury to the bicycle rider.

Another object of the invention is to provide at the front end of the bicycle a crown extending crosswise at the lower end of the head tube, and two generally parallel additional integral tubular members forming a fork extending downwardly and forwardly from the crown, one on each side of the front wheel position, these tubular members having through openings to receive the ends of the front wheel axial shaft, and these two generally parallel additional integral tubular members extending forwardly substantially horizontally beyond the shaft-receiving openings to a point beyond that occupied by the front end of a front wheel, and there having structure for attaching a bumper.

Other objects and advantages of the present invention will be described in the specification and drawings and the essential features thereof will be set forth in the appended claims.

In the drawings,

FIG. 3 is a fragmental sectional view taken along the line 3—3 of FIG. 2; while

Figure 1:
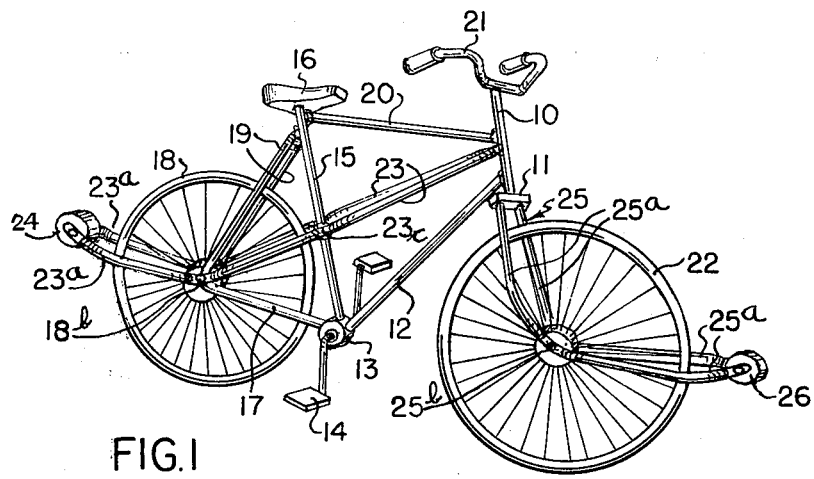
FIG. 1 is a perspective view, simplified, of a bicycle frame of the type normally used by a male rider.
Figure 2:
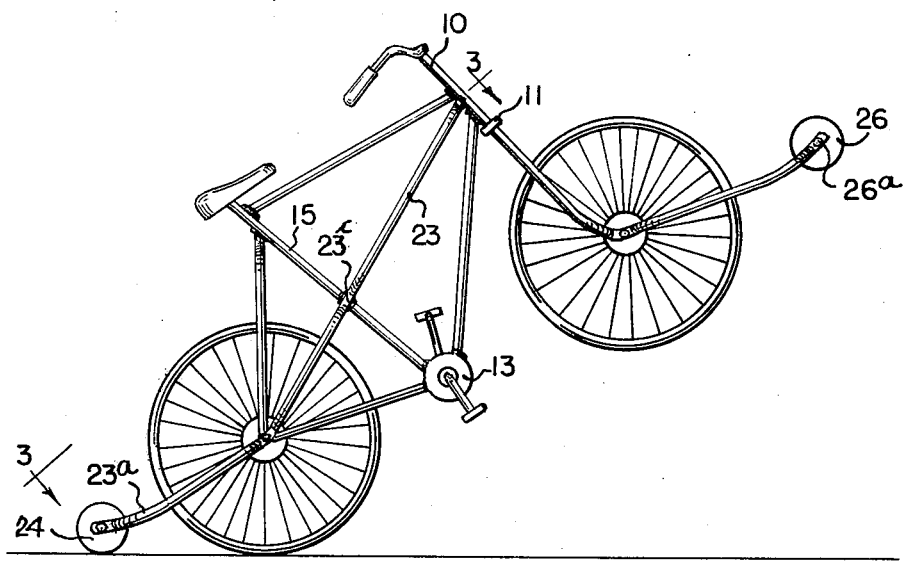
FIG. 2 is a side elevational view of FIG. 1 showing the bicycle frame tilted backwards over the rear tire causing a small roller at the rear end of the integral tubular reinforcing structure to rest upon the ground and prevent the bicycle turning over backward.
Figure 3:
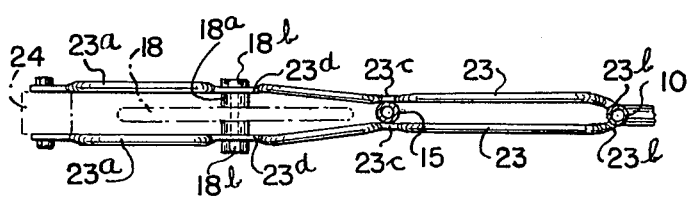

Referring to FIGS. 1, 2 and 3, a bicycle is shown of the type normally used by a male rider and equipped with the present invention. The usual bicycle has a head tube 10 which houses a steering column which is rigidly attached to a crown 11 which is crosswise at the lower end of the head tube. A down tube 12 extends from the head tube to a bottom bracket 13 which houses the chain-driving sprocket (not shown) actuated by the pedals 14 which receive the feet of the rider. A seat support tube 15 extends upwardly and rearwardly at an acute angle to the down tube 12 and has a fixture at the upper end to support the seat 16. A pair of chain stays 17 extend rearwardly, one on each side of the rear wheel from the bottom bracket 13 to the axial shaft 18a of the rear wheel. A back fork 19 comprises two members extending on opposite side of the rear wheel and extending from a point on the frame near the seat downwardly and rearwardly to the rear axial shaft 18a. A top tube 20 extends from the head tube 10 back to the upper end of the seat support tube 15 in the usual manner in a boy's bicycle. The usual steering handlebars are shown at 21. The details of the mounting of the rear wheel 18 and the front wheel 22 in the chain stays 17 and back fork 19, at the rear, and in the front forks 23, at the front, are omitted for clarity of the description. In like manner, the driving chain has been omitted between the bottom bracket 13 and its accompanying drive sprocket and the axis of the rear wheel 18a.

The improvement of this invention consists of two generally parallel and integral tubular members 23 which are rigidly and permanently connected to the head tube 10, and extend rearwardly and downwardly therefrom passing on opposite sides of the seat support tube 15, then backward on opposite sides of the rear wheel passing the rear wheel shaft 18a and extending rearwardly therefrom, as shown at 23a, to a point which will touch the ground, as shown in FIG. 2, when the center of gravity of a rider's body, riding on the rear wheel only, moves backward and approaches dead center over the axis 18a of the rear wheel. Referring to FIG. 3, it will be seen that the upper ends of the tubular members 23 are welded at 23b to the head tube and are slightly flattened at 23c and welded to opposite sides of the seat support tube 15. Farther back where the members 23 pass the axis 18a of the rear wheel, the tubular members are flattened at 23d and are provided with openings to receive the shaft 18a of the rear wheel 18 where the parts are detachably secured by nuts 18b.

At the rear end, where the ends 23a touch the ground as in FIG. 2, there is provided structure for mounting a small roller 24 as by passing a shaft through openings in the parts 23a and securing the same by means of suitable nuts.

Another improvement is shown at the front end of FIGS. 1 and 2 where the front fork 25 comprises two generally parallel additional integral tubular members extending downwardly and forwardly from the crown 11, these tubular members being marked 25a, one respectively on each side of the front wheel. These two tubular members 25a are bent forwardly and downwardly and are provided with suitable through openings at 25b through which to pass the axial shaft of the front wheel 22 and secure the same in position by nuts on the end of the shaft as described in connection with 18b in FIG. 3. These tubular members 25a continue integrally forwardly ahead of the shaft openings 25b to a point beyond that occupied by the front end of the front wheel 22 and are there provided with structure for attaching a bumper such as the small roller 26 which has a shaft 26a extending through suitable openings in the front end of the members 25a and is there secured by suitable nuts. Here again, the tubular members 25a are slightly flattened at the openings 25b so as to facilitate the attachment of the shaft of the front bicycle wheel. This structure gives a very strong support for the front bumper 26 so that the structure is capable of withstanding heavy blows.

Figure 4:
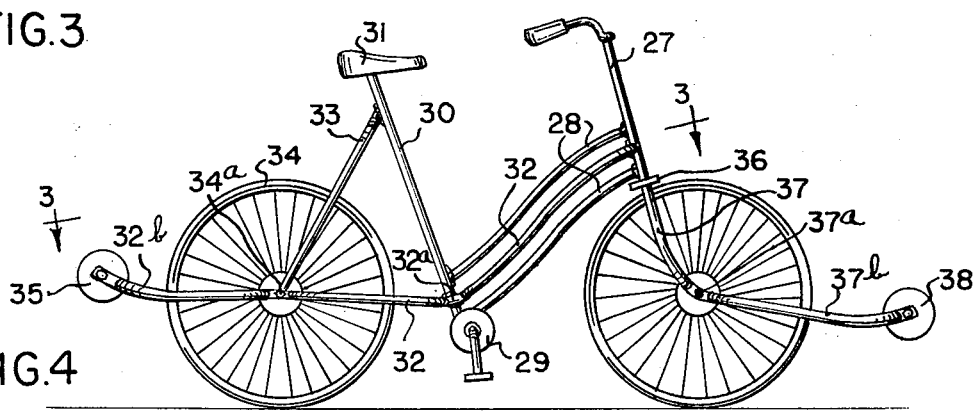
FIG. 4 is a side elevational view of the structure of this invention applied to a bicycle frame which is of the type normally used by a female rider.

In a modification shown in FIG. 4, there is shown a frame of the type normally used by a female rider. This has a head tube 27 to which is rigidly and permanently attached the down tubes 28 which extend down to, and are connected rigidly with, the bottom bracket 29. The seat support tube 30 extends upwardly and rearwardly from the bottom bracket 29 at an acute angle to the down tubes 28 and is provided with a fitting at its upper end to mount the seat 31. Two chain stays 32 extend rearwardly from the bottom bracket 29 on opposite sides of the rear wheel to a point opposite the rear wheel axial shaft. A back fork 33 is rigidly connected at its upper end near the seat 31 and extends downwardly and rearwardly to the point where it is attached to the rear wheel shaft 34a.

This invention is applied to this bicycle by extending the chain stays 32 forwardly and upwardly as shown in FIG. 4 and attaching the upper end of these two members rigidly and permanently to the head tube 27. The tubes 32 are then slightly flattened at 32a and welded to the seat support tube 30 and then extended rearwardly passing the rear axle 34a and extending rearwardly at 32b, beyond the rear axle 34a, in the same manner as described in connection with the parts 23a of FIGS. 1 through 3. A small roller 35 is mounted at the rear end of the tubular portions 32b.

The structure shown in FIG. 4 provides two integral tubular members extending rigidly and permanently from the head tube 27 through an intermediate portion of the frame to the rear axle and to the rear thereof sufficiently to prevent a rider from falling over backward when the roller 32 might reach the position shown for the roller 30b in FIG. 2. This is a very strong structure, capable of withstanding the load applied by a rider of considerable weight.

The structure at the front end of FIg. 4 is like that described in connection with FIGS. 1 and 2 and comprises a crown 36 extending crosswise of the head tube 27 and rigidly secured to the steering column (not shown). Two generally parallel additional integral tubular members 37 provide the front fork of the bicycle, these two members extending on opposite sides of the front wheel, and being slightly flattened at 37a and there provided with openings to receive the axle of the front wheel, and extending therefrom at 37b to a position in which they hold the bumper 38 out in front of the front wheel as shown in FIG. 4.

It should be understood that the tubular members 23 and 32 are described as being generally cylindrical tubes flattened at the places indicated.

It is also understood that the drawing in FIG. 4 has been simplified in the same manner as was described in connection with FIGS. 1 and 2.

What is claimed is:

1. In a bicycle frame for supporting a single front wheel on an axial shaft and a single rear wheel on an axial shaft, comprising a head tube and front fork, a down tube extending from said head tube to a bottom bracket, a seat support tube extending from said bottom bracket at an acute angle to said down tube and having a seat support at its upper end, a pair of chain stays extending substantially horizontally backward from said bottom bracket, and a back fork extending downwardly and rearwardly from a point on said frame near said seat support to the axis of said rear wheel, all of said aforementioned parts being rigidly secured together; the improvement consisting of two generally parallel integral tubular members extending from said head tube past said seat support tube and then past the axis of said rear wheel and then beyond rearwardly to a point which will touch the ground when the center of gravity of a rider's body, riding on the rear wheel only, moves backward and approaches dead center over the axis of said rear wheel, each of said last named two tubular members being one integral piece rigidly and permanently attached to said head tube and to one side of said seat support tube and rigidly and detachably secured at one of the opposite ends of said rear wheel axial shaft.

2. In a bicycle frame as defined in claim 1, structure at said ground-touching point of said two generally parallel tubular members for attachment of a small roller.

3. A bicycle frame as defined in claim 1, wherein said frame is of the type normally used by a male rider.

4. A bicycle frame as defined in claim 1, wherein said frame is of the type normally used by a female rider.

* * * * *